March 8, 1966 H. G. MUENCHINGER 3,238,540
PUNCH MEANS FOR FORMING RECESSES IN FASTENER HEADS
AND DRIVING TOOLS FOR SAID FASTENERS
Original Filed May 26, 1961 4 Sheets-Sheet 2
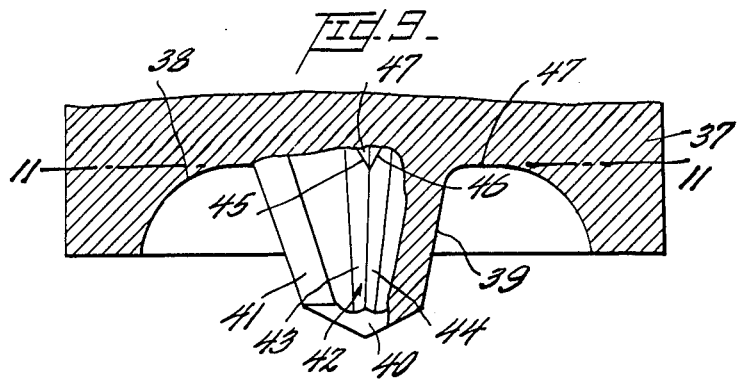
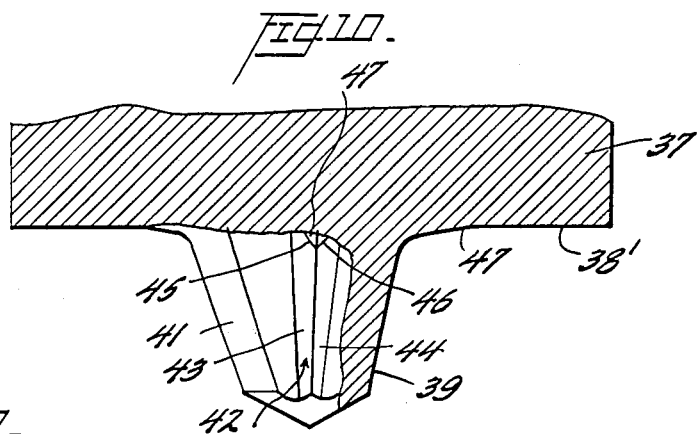
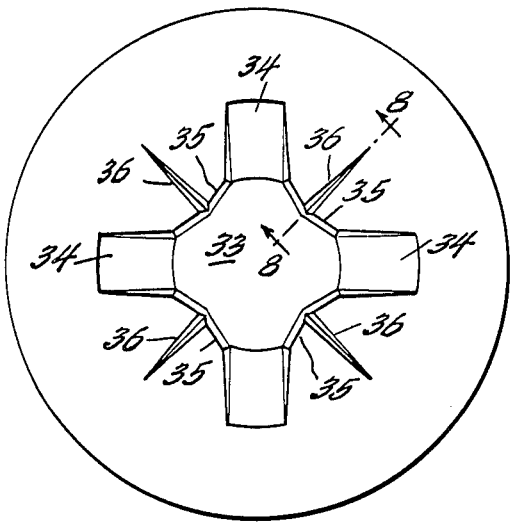
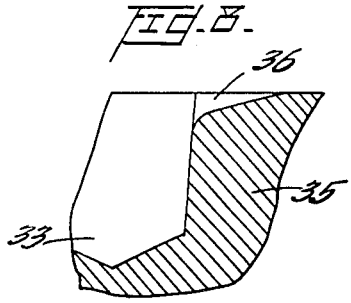
INVENTOR
*Herman G. Muenchinger,*
BY *Watson, Cole, Grindle + Watson*
ATTORNEYS

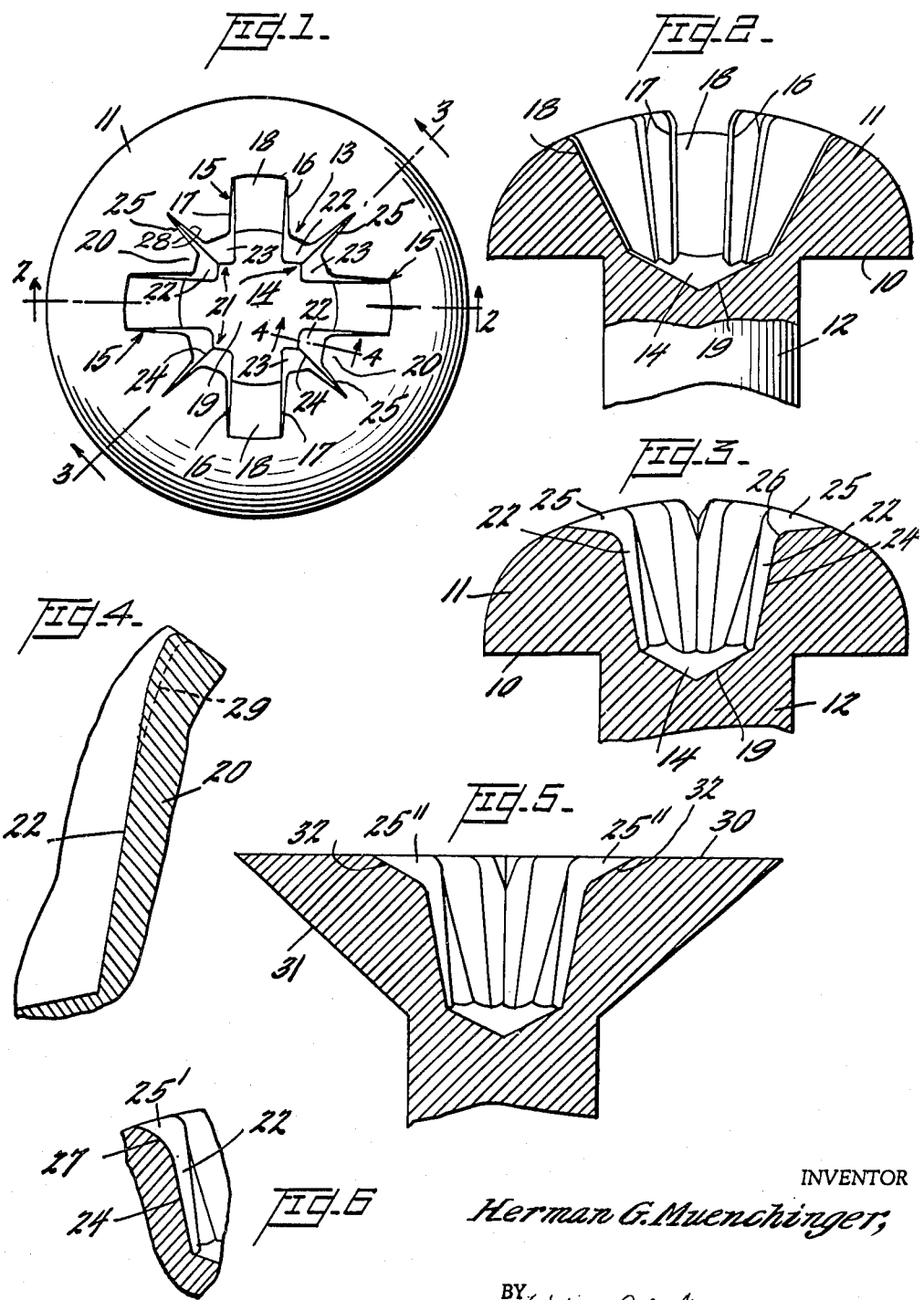

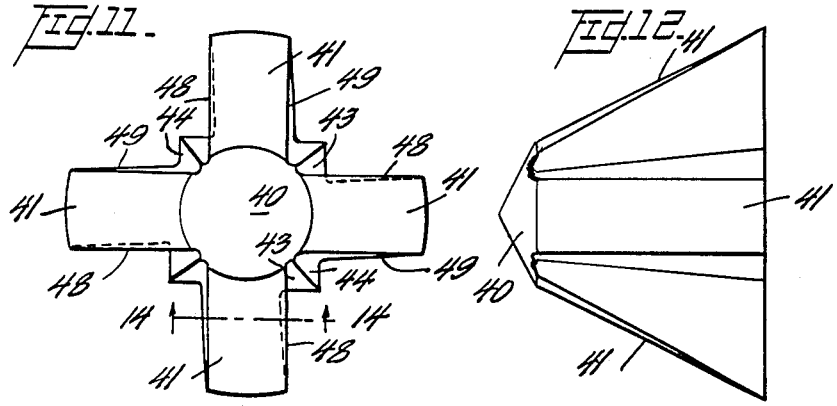
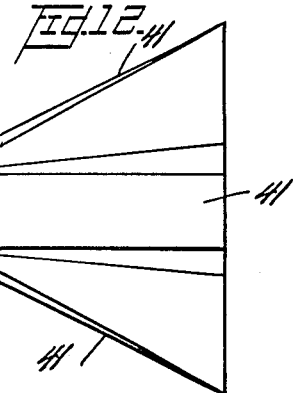
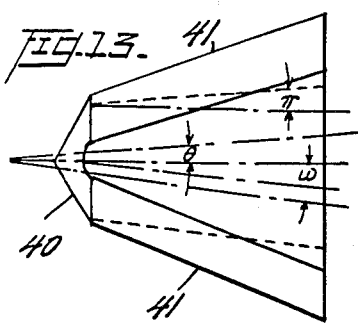
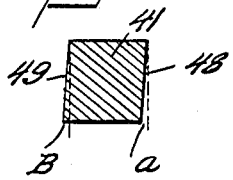
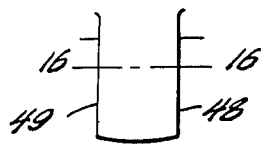
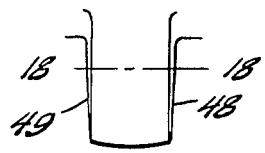
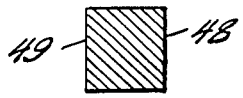
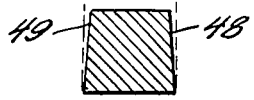
INVENTOR
Herman G. Muenchinger,
BY Watson, Cole, Grindle & Watson
ATTORNEYS

United States Patent Office 3,238,540
Patented Mar. 8, 1966

3,238,540
PUNCH MEANS FOR FORMING RECESSES IN FASTENER HEADS AND DRIVING TOOLS FOR SAID FASTENERS
Herman G. Muenchinger, Chaplin, Conn., assignor to Phillips Screw Company, East Boston, Mass., a corporation of Delaware
Original application May 26, 1961, Ser. No. 112,836. Divided and this application Sept. 4, 1963, Ser. No. 314,828
8 Claims. (Cl. 10—7)

The present application which is a division of Serial No. 112,836, and now abandoned is directed to an improved punch design, for use in punching the recesses of the present invention, and an improved driving tool for use with fasteners provided with such recesses.

This invention relates to recessed head fasteners of the "cross-recessed" type exemplified in an early form by U.S. Patent No. 2,046,839 to Phillips; and more particularly to tools for use in punching the recesses and also for applying or driving and removing the fasteners.

Threaded fasteners having tool-engaging recesses of the "Phillips" type have been widely and successfully used throughout the world, the recess now in most widespread use being that disclosed in U.S. Patent No. 2,474,994, to Tomalis. The latter recess represents an improvement over the original "Phillips" recess, in that the side walls of the grooves of the Tomalis recess are much more nearly parallel to each other, thus reducing the throw-out tendency, as pointed out in the Tomalis patent. Decreasing the throw-out tendency, of course, permits a greater torque to be applied through a driving tool before the latter tends to be thrust axially out of the recess by virtue of the vertical or throw-out component of the applied torque.

In co-pending applications Serial No. 856,133, filed November 30, 1959, now Patent No. 3,108,623, and Serial No. 108,914, filed May 9, 1961, now Patent No. 3,120,012, the applicant has disclosed further improvements of the tools for making and driving recessed head fasteners, and the general object of the present invention is the provision of still further improvements in the said tools.

As explained in said co-pending applications, a widespread use of recessed head fasteners lies in so-called self-tapping applications in which the fasteners are driven into previously drilled but untapped holes in metals, plastics, etc. The successful use of self-tapping fasteners requires that the driving recesses have high torque capacity, easy entry by the driving tool, and provision for maximum stability of the driving tool in the recess. High torque capacity, of course, involves reduction or elimination of the aforementioned throw-out tendency, among other things, while maximum stability of the driver in the recess requires accurate mating of the driver bit and the fastener recess, plus a wedging of the former in the latter. The ease of entry of the driving tool into the recess depends upon the area and vertical taper of the recess, which also affect the ultimate strength of the driving tool and thus the ultimate torque capacity of the driver and fastener combination.

In order to be commercially successful, recessed head fasteners must be capable of manufacture by the two-blow header technique, which involves striking the end of the wire or other material of which the fastener is made, while the same is supported in the die of the heading machine, first with a tool which forms a bloom on the end of the fastener blank and then with a further tool which finishes the head and forms the driver-engaging recess therein. This operation is carried out automatically and at high speed.

Experience has shown that accurate conformance of the material of the fastener blank with the recess-forming punch is very difficult to achieve, because of the phenomenon known as metal fall-away which occurs during punching of the recess. The lack of such accurate conformance, however, enhances the aforementioned throw-out tendency, and also reduces driver stability or, in other words, tends to promote wobbling of the driving tool in the recess which adversely affects assembly line manufacturing and, of course, reduces the torque capacity of the fastener and tool couple. In the aforesaid co-pending application Serial No. 811,105, I have described and claimed a recess which is so designed as to reduce, to a considerable extent, the adverse effects of metal fall-away in the cold heading of recessed head fasteners. Co-pending application Serial No. 112,836 discloses an improved recess design, which still further reduces the fall-away effect encountered in the punching of such recesses.

As explained in co-pending application Serial No. 811,105, metal fall-away in the punching of recessed fastener heads involves two phenomena which may be described as "plowing" and "pull-away." The recess described and claimed in that application is so designed as to reduce the "pull-away" effect, and the recess of Serial No. 112,836 is so designed as to make a still further reduction in such " pull-away" effect. Moreover, the design of the latter recess is such as to permit the use of a punching tool and method which are designed to minimize the over-all fall-away effect, whether due to plowing or to pull-away, by causing a metal flow toward those surfaces of the recess from which the metal would otherwise fall away. This flow of metal toward the last-mentioned recess surfaces occurs during the final stage of the punching of the recess, whereby the metal fall-away which may have already commenced is retarded or compensated, the result being a finished recess in which the conformance of the metal of the fastener head to the header punch is considerably more accurate than heretofore possible.

An important aspect of the present invention lies in the fact that since the recess in question is more accurate than heretofore attainable by quantity production methods, because of the aforesaid reduction in metal fall-away, a notable improvement in driver life has been observed. That is, because the recess is more accurate, and driver stability in the recess is improved, not only can a higher torque be applied without driver throw-out, but the same driver bit can be employed for driving a much greater number of fasteners before it must be discarded due to wear of the driver surfaces.

It has long been known that the throw-out tendency could be largely or completely eliminated, and the torque capacity of recessed head fasteners thus increased, if the groove side walls could be made vertical, i.e., without vertical taper, and several screw recess designs including such vertical groove side walls have been proposed, but no such design has heretofore received commercial acceptance because of the impossibility of producting such fasteners by the cold heading technique. I have discovered a method whereby, with the use of a special punch made in accordance with the present invention, it is possible to produce by the rapid, automatic cold heading technique, fasteners having a tool-engaging recess of which the groove side walls, over a major portion of their area, are substantially or precisely vertical, such recess being claimed in co-pending application Serial No. 112,836. Fasteners provided with the novel recess can be driven by the use of driving tools now in use for driving fasteners provided with the Tomalis recess, but the best results are obtainable by use of a novel driving tool which constitutes another aspect of the present invention.

While the present invention is particularly applicable to self-tapping screws, in which the torque demands are likely to be highest, and to screws of the protruding head type in producing which the metal fall-away problem is greatest, it is also applicable to other types of recessed head fasteners, including fasteners for practically all uses and having various head types including flat head or countersunk screws and bolts.

An object of the present invention consists in the provision of a tool for forming the recesses of recessed head fasteners, which tool has a shank portion and a nib portion formed at one end thereof, said nib portion comprising a central core and more than two equiangularly displaced wings radiating from such core, said nib portion being adapted to penetrate a work-blank for a predetermined distance to form a recess comprising a central portion and a plurality of equiangularly displaced grooves radiating therefrom, and means on said nib portion disposed between each adjacent pair of wings and projecting from said core for penetrating said work blank as the penetration of said nib portion approaches said predetermined distance, to cause displacement of the material of said blank toward each of said adjacent pair of wings so as to urge said material into contact with the wings throughout substantially the full length of the penetrating portions of the wings.

A further object is the provision of a driving tool substantially complementary to the recess formed by the punch of the present invention, therefore, substantially similar to a punch as defined in the preceding paragraph, for driving and removing fasteners having recesses made according to the invention.

Other and further objects, features and advantages will be apparent from the description which follows, read in connection with the accompanying drawings, in which:

FIGURE 1 is a plan view of the head of a fastener provided with a recess punched with a tool formed according to the present invention;

FIGURE 2 is a side view, partly in section on line 2—2 of FIGURE 1;

FIGURE 3 is a vertical section on line 3—3 of FIGURE 1;

FIGURE 4 is a fragmentary vertical section on line 4—4 of FIGURE 1;

FIGURE 5 is a view similar to FIGURE 3 illustrating the application of the present invention to a flat head screw;

FIGURE 6 is a fragmentary vertical sectional view illustrating a modification of the embodiment illustrated in FIGURE 3;

FIGURE 7 is a plan view of a fastener head provided with an alternative recess according to the invention;

FIGURE 8 is a fragmentary vertical section on line 8—8 of FIGURE 7;

FIGURE 9 is a fragmentary side view, partly in section, illustrating a heading punch according to the invention;

FIGURE 10 is a view similar to FIGURE 9 showing an alternative form of heading punch;

FIGURE 11 is an end or bottom plan view of that portion of the punch nib lying below the line 11—11 of FIGURE 9;

FIGURE 12 is a side elevation of the punch nib of FIGURE 11;

FIGURE 13 is a further side elevation corresponding to FIGURE 12 rotated 45 degrees about the punch axis;

FIGURE 14 is a vertical section on line 14—14 of FIGURE 11;

FIGURE 15 is a fragmentary view corresponding to a portion of FIGURE 11 but illustrating an alternative form of the punch wing;

FIGURE 16 is a vertical section on line 16—16 of FIGURE 15;

FIGURE 17 is a view similar to FIGURE 15 but illustrating a further form of the punch wing;

FIGURE 18 is a vertical section on line 18—18 of FIGURE 17;

Figure 19:
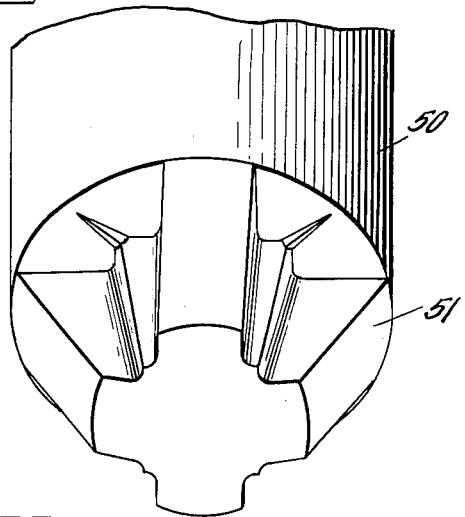
FIGURE 19 is a perspective view of the tip portion of a driving tool for flat head screws according to the invention.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The recess formed by the punch of the present invention is applicable to most types of threaded fasteners, including bolts, screws and the like, the fasteners depicted in FIGURES 1 to 8, inclusive, being designated for convenience. The screw of FIGURES 1 to 4, inclusive, is of the protruding head type, the underside 10 of the head portion 11 being flat and disposed at 90° to the axis of the cylindrical shank portion 12. Protruding head screws may have various head contours, some of which are known as pan head, truss head, oval head, etc. The unthreaded blanks for such screws are conventionally formed in a two-blow cold header, the material, in wire form, being supported in a die provided with a flat exposed end surface corresponding to the flat under surface 10 of the head 11. The wire end protruding from the header die is struck with a first punch which forms a bloom or enlargement of the protruding wire portion, and then with a second punch corresponding generally to that illustrated in FIGURE 9 in having a concavity formed in the working end thereof, the punch nib projecting from the center of such concavity. The second punch imparts the rounded upper surface to the head portion 11 of the screw and, at the same time, forms therein a tool-engaging recess designated generally by the reference character 13 in FIGURE 1.

The recess 13 comprises a central portion 14 and a plurality of radial grooves 15 extending outwardly from the central portion 14. Four grooves 15 are shown in each of the several embodiments illustrated herein, but it will be understood that any reasonable number, greater than two, of grooves 15 may be employed. The grooves 15 are equiangularly spaced. Each groove 15 is formed with a clockwise side wall 16, an anti-clockwise side wall 17 and a bottom wall 18, the latter being inclined inwardly and downwardly to join the generally conical bottom 19 of the central recess portion 14. The grooves 15 are separated by intervening promontories of metal designated, for convenience, as ribs 20 and, in the illustrated embodiment, each rib 20 is provided with a valley 21 extending from the upper end of the central recess portion 14 to the bottom 19 thereof. Each valley 21 is bounded by walls 22 and 23 which form tool-engaging surfaces of the recess 13, supplementing the groove side walls 16 and 17 in the transmission of driving or removal torque. As described in more detail in the aforementioned co-pending application Serial No. 811,105, each of the valley walls 22 and 23 is inclined downwardly toward the screw axis at such an angle that their line of intersection 24 lies at an inclination of between about 10° and 15° to the screw axis. This line of intersection, which represents the bottom of the valley in question, may thus be made to incline at approximately the same angle as the natural angle of fall-away of the material of which the fastener is fabricated and, in this manner, fall-away in the vicinity of the valley bottom is completely or substantially compensated. Accordingly, a correspondingly shaped driving tool will mate accurately with such a recess, at least in the vicinity of the valley bottoms, all the way from the top to the bottom of the recess, thus promoting stability of the driving tool in the recess and permitting a wedging action between the tool and the recess. Such wedging action and the corresponding stability are important in insuring proper application of the screws to the work.

As mentioned above, the provision of substantially vertical groove side walls is recognized to be advantageous from the standpoint of reducing or eliminating throwout. However, it has heretofore been impractical to produce a screw recess having vertical groove side walls because of the metal fall-away phenomenon. A further reason why recesses having such vertical groove side walls have not been used, resides in the fact that the nearer vertical the groove side walls and corresponding wing walls of the driver are made, the less wedging action can take place between the driver and screw. As a practical matter, due to the clearance necessary to permit driver entry into the recess, and to manufacturing tolerances, such wedging has been actually impossible as the groove walls approach vertical. As a result, the driver "bottoms" in the screw recess and is subject to the objectionable wobbling or misalignment hereinbefore mentioned. As pointed out in the said co-pending application Serial No. 811,105, the provision of the valleys 21 of FIGURE 1 enables wedging of the driver in the recess even though the groove side walls are nearly or completely vertical and, moreover, the formation of such valleys during the punching operation overcomes to a considerable extent the problem of metal fall-away, thus enabling the groove side walls to be made more nearly vertical than has heretofore been practical. By reason of the present invention, and particularly the feature now to be described, the groove side walls may be made substantially vertical, or precisely vertical, or one of the walls of each groove may even be given a slight negative inclination (undercut) by a conventional two-blow cold heading technique. This result is achieved by means which eliminate or compensate, to a greater degree than heretofore possible, the effect of metal fall-away in the punching of screw recesses.

Referring again to FIGURES 1–3, it will be seen that each rib 20 between grooves 15 is provided with a notch or depression 25 which extends from the central recess portion 14 radially outwardly to a distance approximating the radial extent of the grooves 15. The depressions 25 may take any suitable shape but preferably, as illustrated in FIGURES 1–3, they take the form of generally horizontal extensions of the inclined or generally vertical valleys 21 of the recess. The depressions 25 are preferably V-shaped in transverse section and may comprise a straight bottom element joining the bottoms of the valleys 21 with a short radius as seen at 26 in FIGURE 3. Alternatively the depressions may have a curved bottom profile as indicated by the curved bottom 27 of the depression 25' seen in FIGURE 6.

The depressions 25 are formed by correspondingly shaped portions of the heading punch, as will be more fully explained in connection with the description of the punch illustrated in FIGURE 9, such punch portions penetrating the metal of the screw head only during the final increments of movement of the punch toward and into the screw blank. As a result of such penetration of the upper surface of the screw head, the metal of the latter is caused to flow in directions normal to the side walls 28 of the depressions, thus in directions toward the side walls 16 and 17 of the grooves 15. Stated differently, the flow of metal away from the punch ribs forming the grooves 15, due to the fall-away phenomenon mentioned above, is retarded or compensated by the formation of the depressions 25 to such an extent that the groove side walls 16 and 17 will conform closely to the ribs of the recess-forming punch, hereinafter described, and may be made vertical for all practical purposes.

The punching of the depressions 25 into the upper surface of the screw head, during the final movement of the header punch, also reduces fall-away of the metal forming the ribs 20 of the recess. This effect is illustrated in FIGURE 4 wherein broken line 29 illustrates, diagrammatically, a typical curvature of the upper portion of a valley wall 22, 23 caused by metal fall-away prior to the present invention. An important correction of this condition is designated by the solid outline of the wall surface 22, from which it will be noted that the fall-away effect is confined to a narrow area adjacent the upper end of the wall 22, thus promoting proper engagement between the driver and the screw recess over a considerably greater area of the latter than has heretofore been possible. As mentioned above, this increases the torque capacity of the couple, as well as improving stability of the driver in the recess, and increasing the useful life of the driver.

FIGURE 5 illustrates the application of the present invention to a flat head or countersunk screw in which the upper surface 30 of the screw head is flat, while the under surface 31 is conical. In this case, in order to terminate the depressions 25'' at a suitable radial distance from the screw axis, the bottoms 32 thereof are inclined upwardly at a substantial angle. The corresponding punch is illustrated in FIGURE 10.

FIGURES 7 and 8 illustrate an embodiment of the invention as applied to an otherwise conventional screw recess as now in widespread use, namely, the recess of the aforesaid Tomalis patent. The recess comprises generally a central portion 33 and radial grooves 34 separated by ribs 35. Centrally of each rib 35 there is provided a radial depression 36 similar to the depressions 25 of FIGURE 1 except that the recess in question is not provided with the valleys 21 of FIGURE 1. The depressions 36 of FIGURE 7 therefore terminate inwardly in a V-shaped notch disposed centrally of the upper end of each rib 35. The effect of forming the depressions 36 in the screw head of FIGURE 7 is partially to eliminate or compensate for the fall-away otherwise encountered in punching screw recesses of this type, and thus to promote driver stability and increase torque capacity as mentioned above. Another effect achieved, both in the embodiment of FIGURE 1 and that of FIGURE 7, is that the metal between each depression 25 or 36, as the case may be, and the adjacent groove side walls is strengthened by work-hardening, thus lessening the tendency for the groove side walls to be deformed by the driving tool in the application of high torques, and thereby increasing the over-all torque capacity of the recess. Another advantage applicable to both recesses lies in the fact that the walls of the depressions 25 and 36 form auxiliary tool-engaging surfaces when used with a complementary driving tool, thus adding a further increment to the over-all torque capacity of the screw and driver couple.

Turning now to FIGURE 9 illustrating a cold header punch for a recessed head screw of the protruding head type, it will be seen that the body 37 of the punch is provided with a concavity 38 at its working end, the recess-forming punch nib 39 projecting outwardly from the central portion of the concavity 38, and terminating in a generally conical tip 40 which forms the bottom of the central recess portion 14 of FIGURE 1. The nib 39 comprises a central core portion provided with wings 41 for forming the recess grooves 15, the punch surfaces between the wings 41 being provided with generally vertical ridges 42 for forming the valleys 21 of FIGURE 1. The surfaces 43 and 44 of each ridge 42 merge into the respective surfaces 45 and 46 of the radial ridges 47 which form the recesses 25 of FIGURE 1 during the final increments of movement of the punch nib 39 into the screw head.

FIGURE 10 illustrates a similar punch for forming the recesses of FIGURE 5 in flat head screws, the several surfaces of the punch nib of FIGURE 10 corresponding to those described above in connection with FIGURE 9, except that the surface 38' of the working end of the punch of FIGURE 10 is flat rather than concave and the nib surfaces which merge with it are correspondingly altered.

FIGURES 11, 12 and 13 illustrate the form of that portion of a punch nib projecting below the line 11—11 of FIGURE 9, which punch nib is suitable for forming the recess of FIGURE 1 having substantially vertical groove side walls. FIGURE 11, which is an end or bottom view, illustrates the fact that the wing walls 48 may be undercut, i.e., may have a slight negative angle, in the present case amounting to about 17' on a vertical plane transverse to the wing 41, corresponding to a negative angle of about 1° at the inclined outer edge of the wing wall. This angle is indicated at α in FIGURE 14. The opposite wall 49 of each wing 41 may have a slight positive angle or inclination, not greater than 3°, designated as β in FIGURE 14. The angle π in FIGURE 13 is the so-called milling angle, namely, the angle between the axis of the work and the axis of relative movement between the work and the milling cutter, before the latter is offset, as mentioned below. In the illustrated embodiment, the angle π is 5°,45'. In order to achieve the inclination of the respective wing walls indicated by the angles α and β in FIGURE 14, it is necessary to offset or laterally incline the axis of relative movement of the work and milling cutter, the angle of offset being designated θ for the wall 49 and ω for the wall 48. The values for these angles employed in the illustrated embodiment are θ 3° and ω 6°,20'. Offsetting the milling cutter for the respective cuts 48 and 49 produces, of course, corresponding variations in the inclination of the ridge surfaces 43 and 44 which are formed during the milling cuts which form the wing walls 48 and 49, respectively.

By suitably offsetting the axis of relative movement of the work and milling cutter, the inclination of the respective wing walls of the punch nib may, within limits, be varied as desired. FIGURES 15 and 16 illustrate a case in which the respective wing walls 48 and 49 are precisely vertical, that is, in planes parallel to the longitudinal axis of the punch, while FIGURES 17 and 18 illustrate the case in which the respective wing walls have a slight positive angle (taper inwardly and downwardly) which may be the same for both walls, or may vary, not to exceed 3° for either wing wall.

Figure 20:
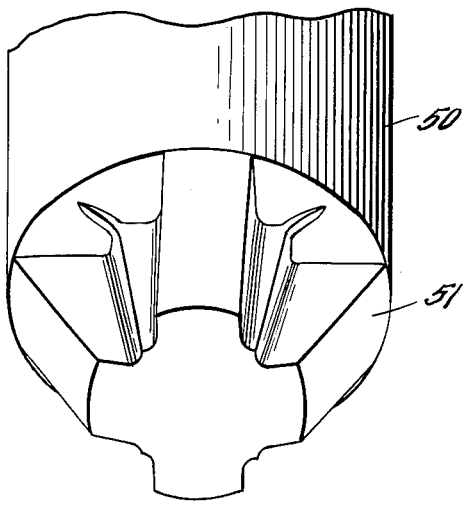
FIGURE 20 is a similar view of a tool suited for protruding head screws according to the invention.

The foregoing description applies to a master punch used for forming a die or matrix in which the header punches are formed, the technique being such that the header punches will have exactly the same angles as those of the master punch. By the same technique, or by any suitable machining or metal working technique which is adapted to quantity production, the driving tools illustrated in FIGURES 19 and 20 are made to have substantially the same tip form as that of the described punch nibs, so as to make the best possible engagement with the screw recesses produced by use of the above-mentioned header punches. By virtue of necessary manufacturing tolerances, however, the driver tips will vary somewhat from the precise dimensions of the punch nibs to provide the small clearances needed for ready entry of the driving tools into the screw recesses. Notwithstanding the aforesaid clearances, however, and for the reasons elaborated at the outset of the specification, the driving tools will make excellent and stable engagement in the recesses, and the screw and driver couples, according to the present invention, will have substantially greater torque capacity and improved stability as compared with those now in use. As seen in FIGURES 19 and 20, the junction of the shank 50 and the recess-engaging nib portion 51 of each tool is substantially planar and normal to the tool axis.

In the appended claims the expression "recess-engaging portion" is intended to encompass the nib of a recess-forming tool, or punch, as well as the shaped tip portion of a driving tool for fasteners having the claimed recesses.

Having thus described my invention, what I claim as new and desire to secure by Letters Patent is:

1. A tool for forming the recesses of recessed head fasteners, said tool having a shank portion and a nib portion formed at one end of said shank portion, said nib portion comprising a central core and a plurality of more than two equiangularly displaced wings radiating therefrom, said nib portion being adapted to penetrate a work blank a predetermined distance to form a recess comprising a central portion and a plurality of equiangularly displaced grooves radiating therefrom, and means on said nib portion disposed between each adjacent pair of said wings and projecting from said core for penetrating said work blank as the penetration of said nib portion approaches said predetermined distance to cause displacement of the material of said blank toward each of said adjacent pair of wings so as to urge said material into contact with said wings throughout the full length of the penetrating portions thereof, said last means extending outwardly from said core to points substantially radially beyond the intersections of the adjacent wings with said core at the plane of the junction of said nib and shank portions, whereby substantial portions of said means are radially coextensive with substantial portions of said wings.

2. A tool for forming the recesses of recessed head fasteners, said tool having a shank portion and a nib portion formed at one end of said shank portion, said nib portion comprising a central core and a plurality of more than two equiangularly displaced wings radiating therefrom, said nib portion being adapted to penetrate a work blank a predetermined distance to form a recess comprising a central portion and a plurality of equiangularly displaced grooves radiating therefrom, and means on said nib portion disposed between each adjacent pair of said wings for penetrating said work blank between each said wing pair and causing the material adjacent the surface of said blank to be displaced toward each of said adjacent pair of wings so as to urge said material into contact with said wings, said last means extending outwardly from said core to points substantially radially beyond the intersections of the adjacent wings with said core at the plane of the junction of said nib and shank portions, whereby substantial portions of said means are radially coextensive with substantial portions of said wings.

3. A tool as defined in claim 2, said central core having generally vertical ridges projecting therefrom between adjacent wings, said ridges being of generally triangular cross section, and of downwardly diminishing sectional area, said ridges merging at their larger ends with said means.

4. A tool as defined in claim 3, said means comprising generally radial ridges of generally triangular cross section and of outwardly diminishing sectional area.

5. A tool for engagement in the recesses of recessed head fasteners, said tool having a shank portion and a recess-engaging portion formed at one end of said shank portion, the junction of said shank and recess-engaging nib portions being substantially planar and normal to the tool axis, said recess-engaging portion comprising a central core portion and at least three equiangularly spaced wings radiating therefrom, said core portion having generally vertical ridges projecting therefrom between adjacent wings, said ridges being of generally triangular cross section, and of downwardly diminishing sectional area, and said recess-engaging portion also comprising means disposed between each adjacent pair of said wings and projecting downwardly of the plane of junction of said nib and shank portions, from the adjacent end of said shank portion, said last means being adapted to engage recess portions disposed between the radial grooves of a corresponding recess.

6. A tool as defined in claim 5, said last means comprising generally radial ridges.

7. A tool as defined in claim 6, said last-mentioned ridges being of generally triangular cross section and of outwardly diminishing sectional area.

8. A tool as defined in claim 6, said last-mentioned ridges merging at their inner ends with the upper ends of said respective generally vertical ridges.

References Cited by the Examiner

UNITED STATES PATENTS

| | | | |
|---|---|---|---|
| 3,108,623 | 10/1963 | Muenchinger | 10—7 |
| 3,120,012 | 2/1964 | Muenchinger | 10—7 |
| 3,151,519 | 10/1964 | Phipard | 10—7 |

ANDREW R. JUHASZ, *Primary Examiner.*